UNITED STATES PATENT OFFICE.

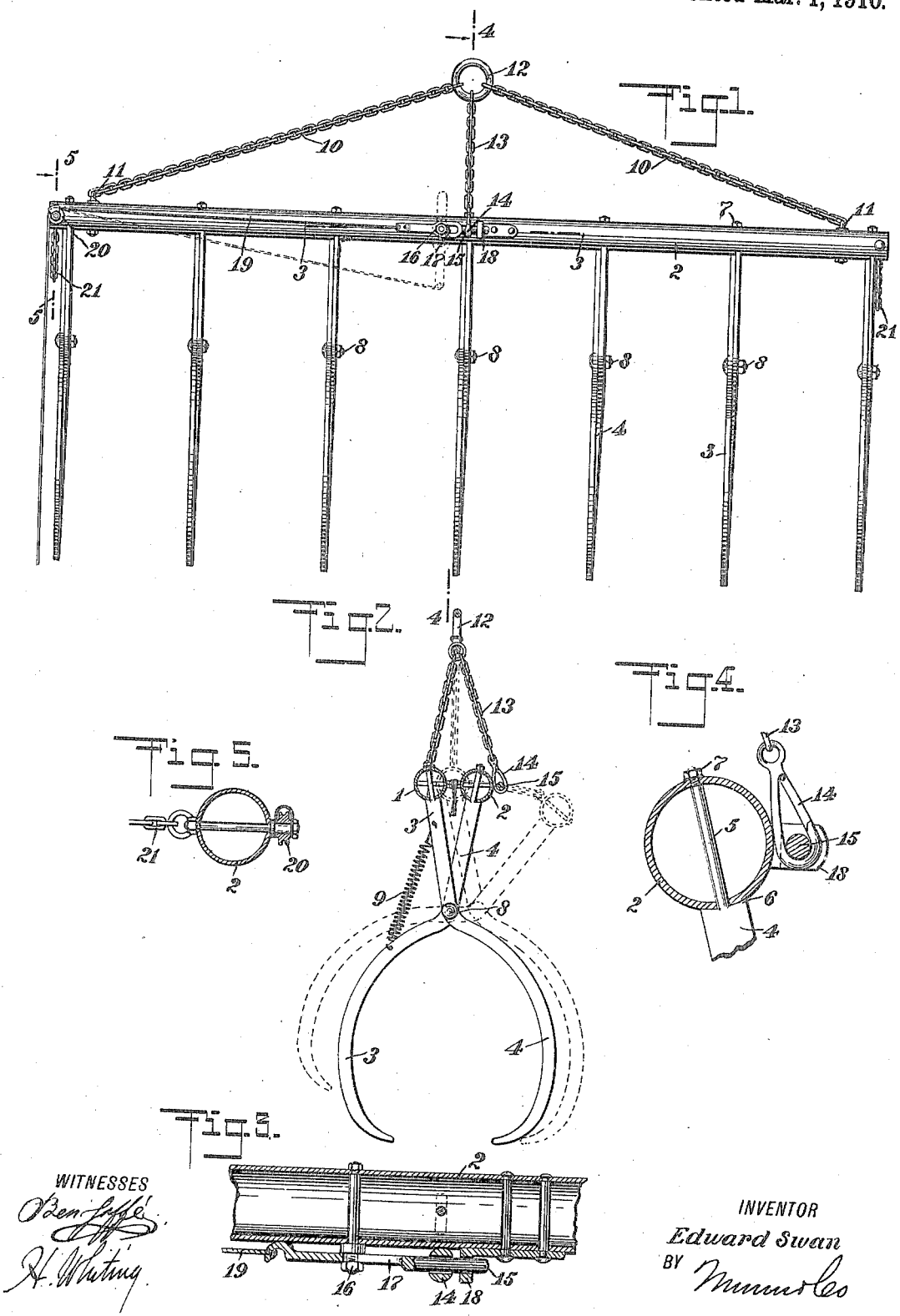

EDWARD SWAN, OF ELKO, NEVADA.

HAY-FORK.

950,875.  Specification of Letters Patent.  Patented Mar. 1, 1910.

Application filed May 12, 1909. Serial No. 495,515.

*To all whom it may concern:*

Be it known that I, EDWARD SWAN, a citizen of the United States, and a resident of Elko, in the county of Elko and State of Nevada, have invented a new and Improved Hay-Fork, of which the following is a full, clear, and exact description.

This invention relates to a new and improved hay fork of the grapple type, which is adapted to lift a large amount of hay to unload the same from a wagon, and which is also adapted to readily deposit said hay on a mow or stack.

The object of the invention is to provide a device which will be simple in construction, quick and positive in its action and at the same time strong and durable.

The invention consists in the construction and combination of parts, to be more fully described hereinafter and particularly set forth in the claims.

Reference is to be had to the accompanying drawings forming a part of this specification, in which similar characters of reference indicate corresponding parts in all the views, and in which—

Figure 1 is a vertical side view of my device; Fig. 2 is a vertical end view of the same; Fig. 3 is a horizontal longitudinal section on the line 3—3 in Fig. 1; Fig. 4 is a vertical transverse section on the line 4—4 in Fig. 1; and Fig. 5 is a vertical transverse section on the line 5—5 in Fig. 1.

Referring more particularly to the separate parts of the device, 1 and 2 indicate supporting bars, to which are removably attached the upper ends of a plurality of tines 3 and 4. Each of the tines 3 and 4 have reduced rods 5 extending from their upper ends through the bars 1 and 2, which are preferably metal tubes. The top ends of the tines 3 and 4 are curved at 6, to conform to the outer surfaces of the bars 1 and 2. The rods 5 are screw-threaded at their outer ends, where they pass through the tubes 1 and 2, and are secured to said tubes by nuts 7. The tines 3 and 4 cross each other, and are pivoted together preferably in individual pairs by suitable pivot-pins 8, from which they extend at a curve downwardly and inwardly to form positive grappling members.

A spring 9 may be provided to join one or more of the portions of the tines below the pivot-pins 8 to the upper portions of the opposite tines above the pivot-pins 8, so that the grapple will normally be held in its open position, as indicated in the dotted lines in Fig. 2.

In order to suspend and hoist the grapple, there are provided suitable connecting chains 10, which are secured in any well-known manner to one of the supporting bars as by eye-bolts 11, and which are connected at their opposite ends by a supporting link 12. For the purpose of suspending the other supporting bar 2 and holding the tines in closed relation, there is provided a suitable chain 13, which is connected at one end to the link 12, and at its opposite end has a catch 14, which is adapted to be engaged by a locking bolt 15 slidingly secured on the supporting bar 2 by any suitable means, such as a pin 16 working in a slot 17 on said sliding bolt. One end of the sliding bolt 15 is adapted to engage an opening in a latch member 18, secured to the bar 2. To the other end of the locking bolt 15, a suitable trip-cord 19 is connected and runs over a suitable pulley 20 at the end of the bar 2.

In order to limit the amount to which the tines 3 and 4 may spread apart, there are provided chains 21, which are secured in any suitable manner to the ends of the supporting bars 1 and 2, and are adapted to limit the relative motion of said bars.

The operation of the device is readily understood from the above description. The tines are inserted in a load of hay, and the supporting bars 1 and 2 brought together, and the locking bolt 15 passes through the catch 14 and into the latch 18, thus locking the tines in the closed position indicated in full lines in Fig. 2. The hay fork is then hoisted and brought over the place where it is desired to deposit the load of hay or the like, when the trip-cord 19 is pulled, thus sliding the locking-bolt 15 backward so that it is pulled out of the latch 18. When this position is reached, the weight of the hay in the grappling tines tends to spread them apart, thus forcing the locking bolt 15 into the position indicated in dotted lines in Fig. 1, thereby permitting the tines to open fully and thus allowing them to deposit their load. The spring 9 assists to automatically open the tines when the locking bolt 15 has been released.

Having thus described my invention, I claim as new and desire to secure by Letters Patent:—

1. In a hay fork, the combination with a plurality of pairs of tines having independent pivots, of a pair of supporting bars connecting said tines.

2. In a hay fork, the combination with a plurality of tines having independent pivots, of a pair of supporting bars connecting said tines together, means for suspending one of said supporting bars, and means for locking said tines in closed relation.

3. In a hay fork, the combination with a pair of hollow supporting bars, of a plurality of tines removably secured to each of said supporting bars, and means for independently pivoting said tines together in pairs.

4. In a hay fork, the combination with a pair of hollow supporting bars, of a plurality of tines removably secured to each of said supporting bars, means for independently pivoting said tines together in pairs, suspending means connected to one of said supporting bars, a bolt for locking said tines in closed relation, and means for automatically opening said tines when said bolt has been withdrawn.

5. In a hay fork, the combination with a pair of hollow supporting bars, of a plurality of tines removably secured to each of said supporting bars, means for independently pivoting said tines together in pairs, suspending means connected to one of said supporting bars, a locking bolt for holding said tines in closed relation, and a spring connecting one or more of said pairs of tines adapted to automatically open said tines when said bolt has been released.

6. In a hay fork, the combination with a pair of hollow supporting bars, of a plurality of tines, each of said tines having a curved upper end adapted to engage the outer surface of one of said supporting bars, means for removably securing said tines to said supporting bars, means for independently pivoting said tines in pairs, means for locking said tines in closed relation, means for automatically opening said tines when said locking means has been released, and means for limiting the degree of opening of said tines.

7. In a hay fork, the combination with a pair of hollow supporting bars, of a plurality of tines removably secured to said supporting bars, each of said tines having a reduced upper portion adapted to pass through one of said supporting bars and also having a curved upper end adapted to engage the curved outer surface of one of said supporting bars, means for securing said reduced portions to said supporting bars, suspending chains connected to one of said supporting bars, a locking bolt slidingly secured on the other of said supporting bars, means for connecting said suspending chains with said locking bolt whereby said tines are held in closed relation, a latch adapted to engage said locking bolt, a tripcord secured to said locking bolt and adapted to operate the same, pins adapted to pivotally secure said tines in independent pairs, a spring adapted to automatically open said tines when said locking bolt has been withdrawn from said latch, and chains adapted to limit the opening motion of said tines.

In testimony whereof I have signed my name to this specification in the presence of two subscribing witnesses.

EDWARD SWAN.

Witnesses:
  Edwin E. Caine,
  Chas. F. Holland.